United States Patent
Smith et al.

(10) Patent No.: US 11,386,506 B2
(45) Date of Patent: Jul. 12, 2022

(54) SYSTEM AND TECHNIQUE FOR INFLUENCE ESTIMATION ON SOCIAL MEDIA NETWORKS USING CAUSAL INFERENCE

(71) Applicant: Massachusetts Institute of Technology, Cambridge, MA (US)

(72) Inventors: Steven Smith, Cambridge, MA (US); Edward Kao, Belmont, MA (US); Danelle Shah, Lexington, MA (US); Olga Simek, Lexington, MA (US); Donald Rubin, Cambridge, MA (US)

( * ) Notice: Subject to any disclaimer, the term of this patent is extended or adjusted under 35 U.S.C. 154(b) by 517 days.

(21) Appl. No.: 16/379,059

(22) Filed: Apr. 9, 2019

(65) Prior Publication Data

US 2019/0311441 A1    Oct. 10, 2019

Related U.S. Application Data

(60) Provisional application No. 62/654,782, filed on Apr. 9, 2018.

(51) Int. Cl.
| | |
|---|---|
| *G06F 16/951* | (2019.01) |
| *G06Q 50/00* | (2012.01) |
| *G06F 17/18* | (2006.01) |

(52) U.S. Cl.
CPC .......... *G06Q 50/01* (2013.01); *G06F 16/951* (2019.01); *G06F 17/18* (2013.01)

(58) Field of Classification Search
CPC .. G06Q 50/01; G06Q 10/063; G06F 16/9535; G06F 16/951; G06F 17/18; H04L 67/22
See application file for complete search history.

(56) References Cited

U.S. PATENT DOCUMENTS

| | | | |
|---|---|---|---|
| 2014/0149418 A1* | 5/2014 | Qin ................. | G06Q 50/01 |
| | | | 707/740 |
| 2015/0081725 A1* | 3/2015 | Ogawa ............. | H04L 67/22 |
| | | | 707/754 |

(Continued)

OTHER PUBLICATIONS

Berger, "The Methodology of the Hamilton 68 Dashboard;" Alliance for Securing Democracy (asd); Aug. 7, 2017; 5 Pages.

(Continued)

*Primary Examiner* — Jungwon Chang
(74) *Attorney, Agent, or Firm* — Daly, Crowley, Mofford & Durkee LLP

(57) ABSTRACT

The concepts, systems and methods described herein are directed towards a method for detection and quantification of influence. The system is provided to including: a network sampling processor, a narrative discovery processor, and an influence quantification processor. The network sampling processor is configured to sample information on one or more social media networks. The narrative discovery processor is configured to: receive sampled information from the network sampling processor, and in response thereto identify a narrative related to a subset of information sampled by the network sampling processor. The influence quantification processor is configured to: receive information related to the narrative and to process the information via a network causal inference process to quantify influence of the narrative on the one or more social media networks.

10 Claims, 11 Drawing Sheets

(56) References Cited

U.S. PATENT DOCUMENTS

| | | | | |
|---|---|---|---|---|
| 2015/0193535 | A1* | 7/2015 | Balmin | G06F 16/9535 |
| | | | | 707/706 |
| 2017/0300823 | A1* | 10/2017 | Bostick | G06Q 50/01 |
| 2017/0339089 | A1* | 11/2017 | Longdale | A63F 13/63 |
| 2018/0158097 | A1 | 6/2018 | Marlow et al. | |
| 2021/0150564 | A1* | 5/2021 | Robinson | G06Q 10/063 |

OTHER PUBLICATIONS

Borger, "US Official says France Warned about Russian Hacking Before Macron Leak;" The Guardian; May 9, 2017; 4 Pages.

Budak et al., "Limiting the Spread of Misinformation in Social Networks;" Proceedings of the 20th International Conference on World Wide Web (WWW 2011); Conference Paper: Jan. 2011; 10 Pages.

Chekinov et al., "The Nature and Content of a New-Generation War;" Military Thought; Dec. 30, 2015; 12 Pages.

Chen et al., "Efficient Influence Maximization in Social Networks;" Proceedings of the 15th ACM SIGKDD International Conference on Knowledge Discovery and Data Mining; Conference Paper: Jan. 2009; 9 Pages.

Confessore et al., "Technology;" The Follower Factory—The New York Times; Jan. 27, 2018; 16 Pages.

Fan et al., "Maximizing Rumor Containment in Social Networks with Constrained Time;" Social Network Analysis and Mining; Dec. 2014; 10 Pages.

Gelman et al., "Chapter 11: Basics of Markov Chain Simulation;" Bayesian Data Analysis, Third Edition; Chapman and Hall Book; Oct. 3, 2013; 25 Pages.

Ho et al., "Control of Epidemics on Graphs;" IEEE 54th Annual Conference on Decision and Control (CDC); Dec. 15, 2015; 6 Pages.

Imbens et al., "Chapter 12: Unconfounded Treatment Assignment;" Causal Inference for Statistics, Social, and Biomedical Sciences; Cambridge University Press; Jan. 2015; 33 Pages.

Jin et al., "Epidemiological Modeling of News and Rumors on Twitter;" Proceedings of the 7th Workshop on Social Network Mining and Analysis (SNA-KDD); Aug. 11, 2013; 9 Pages.

Kao, "Causal Inference Under Network Interference: A Framework for Experiments on Social Networks;" Ph.D Thesis at Harvard Department of Statistics, Harvard University; Aug. 28, 2017; 123 Pages.

Kempe et al., "Maximizing the Spread of Influence Through a Social Network;" 9th ACM SIGKDD International Conference on Knowledge Discovery and Data Mining; Aug. 24, 2003; 10 Pages.

Kimura et al., "Tractable Models for Information Diffusion in Social Networks;" Proceedings of 10th European Conference on Principles of Data Mining and Knowledge Discovery (PKDD); Sep. 18, 2006; pp. 259-271; 13 Pages.

Leskovec et al., "Cost-effective Outbreak Detection in Networks;" Proceedings of the 13th ACM SIGKDD International Conference on Knowledge Discovery and Data Mining; Aug. 12, 2007; pp. 420-429; 10 Pages.

Leskovec et al., "Sampling from Large Graphs;" Proceedings of the 12th ACM SIGKDD International Conference on Knowledge Discovery and Data Mining; Aug. 20, 2006; 8 Pages.

Li et al., "Influence Maximization in Social Networks with User Attitude Modification;" IEEE International Conference on Communications (ICC 2014); Conference Paper: Jun. 2014; 6 Pages.

Marantz, "The Far-Right American Nationalist who Tweeted #Macronleaks;" The New Yorker, May 7, 2017; 4 Pages.

Myers et al., "Clash of the Contagions: Cooperation and Competition in Information Diffusion;" IEEE 12th International Conference on Data Mining; Dec. 10, 2012; pp. 539-548; 10 Pages.

Nguyen et al., "Sources of Misinformation in Online Social Networks: Who to suspect?;" Military Communications Conference (MILCOM 2012); Oct. 2012; 6 Pages.

Putin, "The Military Doctrine of the Russian Federation;" Press Release, No. Pr.-2976; Dec. 25, 2014; 13 Pages.

Rosenbaum et al., "The Central Role of the Propensity Score in Observational Studies for Casual Effects;" Biometrika, vol. 70, No. 1; Apr. 1, 1983; pp. 41-55; 15 Pages.

Shah et al., "Rumors in a Network: Who's the Culprit?;" IEEE Transactions on Information Theory, vol. 57, Issue 8; Aug. 2011; 9 Pages.

Shalizi et al., "Homophily and Contagion are Generically Confounded in Observational Social Network Studies;" Sociological Methods & Research, vol. 40, No. 2; Nov. 30, 2010; pp. 211-239; 27 Pages.

Simek et al., "Threat Network Detection: Social Media as a Sensor for Dark Network Activities;" PowerPoint Presentation; Graph Exploitation Symposium; May 16, 2017; 20 Pages.

Simek et al., "XLab: Early Indications & Warning from Open Source Data with Application to Biological Threat;" Proceedings of the 51st Hawaii International Conference on System Sciences (HICSS); Jan. 2018; 10 Pages.

Smith et al., "Bayesian Discovery of Threat Networks;" IEEE Transactions on Signal Processing, vol. 62, Issue 20; Oct. 2014; pp. 5324-5338; 14 Pages.

Smith, "Covariance, Subspace, and Intrinsic Cramér-Rao Bounds;" IEEE Transactions on Signal Processing, vol. 53, Issue 5; Apr. 18, 2005; pp. 1610-1630; 21 Pages.

Smith et al., "Network Discovery Using Content and Homophily;" IEEE International Conference on Acoustics, Speech and Signal Processing (ICASSP); Apr. 15, 2018; 5 Pages.

Starbird et al., "Rumors, False Flags, and Digital Vigilantes: Misinformation on Twitter after the 2013 Boston Marathon Bombing;" Proceedings of iConference; Mar. 2014; pp. 654-662; 9 Pages.

Stewart et al., "Examining Trolls and Polarization with a Retweet Network;" Proceedings of ACM Workshop on Misinformation and Misbehavior Mining on the Web; Jan. 2018; 6 Pages.

Subrahmanian et al., "The DARPA Twitter Bot Challenge;" Communications of the ACM; Computer Journal, vol. 49, Issue 6; Jun. 2016; 17 Pages.

Tambuscio et al., "Fact-checking Effect on Viral Hoaxes: A Model of Misinformation Spread in Social Networks;" Proceedings of the 24th International Conference on World Wide Web (WWW'15 Companion); May 18, 2015; pp. 977-982; 6 Pages.

Toulis et al., "Estimation of Causal Peer Influence Effects;" Proceedings of the 30th International Conference on Machine Learning, vol. 28, Issue 3; Jun. 2013; pp. 1489-1497; 9 Pages.

Twitter, Inc., "API Overview;" Available at https://dev.twitter.com/overview/api; Retrieved Jan. 2018; 3 Pages.

Ugander et al., "Graph Cluster Randomization: Network Exposure to Multiple Universes;" Proceedings of the 19th ACM SIGKDD International Conference on Knowledge Discovery and Data Mining; Aug. 11, 2013; pp. 329-337; 9 Pages.

U.S. House Permanent Select Committee on Intelligence, "HPSCI Minority Exhibits During Open Hearing;" Unclassified—HPSCI Minority: Exhibit of the user account handles that Twitter has identified as being tied to Russia's "Internet Research Agency;" Nov. 1, 2017; 68 Pages.

Varol et al., "Online Human-Bot Interactions: Detection, Estimation, and Characterization;" Proceedings of the Eleventh International AAAI Conference on Web and Social Media (ICWSM 2017); Mar. 27, 2017; 10 Pages.

Vosoughi, "Automatic Detection and Verification of Rumors on Twitter;" Ph.D Thesis for the Program in Media Arts and Sciences at Massachusetts Institute of Technology; Jun. 2015; 147 Pages.

Watts, Disinformation: A Primer in Russian Active Measure and Influence Campaigns, Panel I; Hearing on Russian Information Operations before the United States Senate Intelligence; Hearing 115-40, Part 1 from the U.S. Government Publishing Office; Mar. 30, 2017; 46 Pages.

Wen et al., "A Sword with Two Edges: Propagation Studies on Both Positive and Negative Information in Online Social Networks;" IEEE Transactions on Computers, vol. 64, No. 3; Mar. 2015; 14 Pages.

Zhang et al., "Limiting the Spread of Misinformation while Effectively Raising Awareness in Social Networks;" International Con-

(56) References Cited

OTHER PUBLICATIONS ference on Computational Social Networks (CSoNet 2015), Lecture Notes in Computer Science, vol. 9197; pp. 35-47; Jul. 31, 2015; 13 Pages.

* cited by examiner

FIG. 9

SYSTEM AND TECHNIQUE FOR INFLUENCE ESTIMATION ON SOCIAL MEDIA NETWORKS USING CAUSAL INFERENCE

CROSS REFERENCE TO RELATED APPLICATION

This application claims the benefit of U.S. Provisional Application No. 62/654,782 filed Apr. 9, 2018, under 35 U.S.C. § 119(e) which application is hereby incorporated herein by reference in its entirety.

GOVERNMENT RIGHTS

This invention was made with Government support under Grant No. FA8702-15-D-0001 awarded by the United States Air Force. The Government has certain rights in the invention.

BACKGROUND

As is known in the art, a "social media network" generally refers to one or more computer-implemented systems that facilitate the creation and sharing of information, ideas, career interests and other forms of expression via virtual communities. "Social media" generally refers to the exchange of information, ideas, activities, and interactions which take place on social media networks. The computer-implemented systems are coupled through one or more computer networks (e.g., the Internet). Thus, social media is said to be (or take place) "on-line." Consequently, many individuals (or "users") may belong to one or more on-line virtual communities within a social media network.

Most social media networks are user-interactive. Thus, social media networks generally allow users to add user-generated content to the network.

Such content may include, for example, text posts, comments, and digital photos or videos. The ability to add data generated through such on-line interactions is a significant characteristic of social media and a social media network. In addition, social media network typically enable users to create service-specific profiles for social media "outlets" (i.e., a website or "app" designed and maintained by a social media organization). Social media facilitates the development of online social networks by connecting a user's profile with those of other individual users or with groups. Some of the most popular social media networks (or outlets) may include Facebook (and its associated Facebook Messenger), YouTube, WeChat, Instagram, QQ, QZone, Weibo, Twitter, Tumblr, Telegram, Reddit, Baidu Tieba, LinkedIn, LINE, Snapchat, Pinterest, Viber, and VK. Other social media outlets or networks also exist, and new outlets are being added.

Thus, users typically access social media via web-based technologies through processing devices (e.g., desktop computers and laptop computers) or download services that offer social media functionality to a user's mobile device(s) (e.g., smartphones and tablets). As users engage with these electronic social media services, they can create highly interactive platforms through which individuals, communities, and organizations can share, co-create, discuss, and modify user-generated content or pre-made content posted online.

Users may form relationships through social media networks. Relationships formed through social media networks may change the way groups of people or groups of organizations interact and communicate. Social media differs from paper-based media (e.g., magazines and newspapers) and traditional electronic media such as TV broadcasting in many ways, including quality, reach, frequency, interactivity, usability, immediacy, and performance. For example, social media networks operate in a dialogic transmission system (i.e., many sources to many receivers). This model is in contrast to traditional media which operates under a monologic transmission model (i.e., one source to many receivers). Examples include a newspaper (i.e., a single source delivered to many subscribers), and a radio station (i.e., a radio station broadcasts the same program(s) to an entire city or community).

Social media networks are used by individuals across the industrialized world. Estimates indicate that an increasing number of individuals will receive information via social media networks in the coming years. It is also estimated that social media networks will provide more influence than traditional media (e.g., paper-based media and electronic media) in the near future. This large-scale growth of worldwide social media networks is built, at least in part, upon the social media characteristics of universal access, immediacy, and power to communicate with and influence others.

SUMMARY

In accordance with the concepts, systems, and techniques described herein, it has been recognized that the social media characteristics of easy (and ideally universal) access, immediacy, and power to communicate with and influence others have also created a potent new medium and an enabling technology for disinformation and propaganda. Concerns have thus been raised about possible links between social media use and an undue amount of influence on corporations, organizations, advocacy groups, political parties, and governments.

In accordance with the concepts described herein, it has been recognized that detecting and estimating influence on social media networks is the problem of inferring the impact of an input at one or a subset of nodes in a social media network on the rest of the social media network. This problem arises (both theoretically and practically) in marketing on social media, influence maximization, information diffusion, and the spread of both information and disinformation in social networks.

In accordance with further aspects of the concepts, systems and techniques taught herein an approach to quantify influence on social media networks is described. The approach uses a network causal inference framework applied to social media network data arising from graph sampling and filtering. The framework contains the generality to account for influence on populations with and without observed outcomes, which addresses the issue of biased sampling. The groups may contain individuals that are receptive to influence, or not receptive, defined as an invariant outcome to the influence exposure. The estimation problem is implemented using Bayesian inference considering these distinctive aspects of social media networks:

The influence estimation approach described herein aims to correctly attribute impact by accounting for causal narrative propagation over the network while addressing the challenge of discriminating between actual social influence and mere homophily.

According to one illustrative embodiment, a system for detection and quantification of influence may include a network sampling processor, a narrative discovery processor, and an influence quantification processor. The network sampling processor may be configured to sample information on one or more social media networks. The narrative discovery processor may be configured to: receive sampled information from the network sampling processor, and in response thereto identify a narrative related to a subset of information sampled by the network sampling processor. The influence quantification processor may be configured to: receive information related to the narrative and to process the information via a network causal inference process to quantify influence of the narrative on the one or more social media networks.

In embodiments, the network sampling processor may be further configured to: identify a context of interest; and sample the information on the one or more social media networks to generate a subset of the information related to the context of interest.

In embodiments, the influence quantification processor may be further configured to: in response to the quantified influence of the narrative exceeding a predefined threshold, alert one or more network administrators about the narrative.

In embodiments, the influence quantification processor may be further configured to: generate actionable information related to the narrative having the quantified influence exceeding the predefined threshold; and transfer the actionable information to the one or more network administrators.

In embodiments, the system may further include a network interface which is configured to connect the one or more social media networks via an internet.

In embodiments, the influence quantification processor may further include: a model database comprising one or more potential outcome models; a model parameter estimator configured to estimate one or more parameters of a potential outcome model selected from the one or more potential outcome models; and an unseen counter-factual outcomes processor configured to quantity influence of the narrative using the selected potential outcome model. Here, the model parameter estimator may receive the selected potential outcome model, observed outcomes on the one or more social media networks, and observed network structure.

According to another illustrative embodiment utilizing the concepts described herein, a method for detection and quantification of influence may include: collecting information from one or more social media networks; identify a context of interest; sampling the information collected from the one or more social media networks to generate a subset of the information related to the context of interest; identifying one or more narratives contained within the generated subset of information and related to the context of interest; and quantifying influence of the one or more identified narratives on the context of interest.

In embodiments, the method may further include: in response to the impact of the one or more narratives reaching a predetermined threshold, alerting one or more network administrators.

In embodiments, the step of quantifying the influence of the one or more identified narratives may include evaluating at least one of content-based information and account-based information.

In embodiments, collecting information may comprise one or more of: (a1) observing interactions between one or more accounts on one or more social media networks interact; (a2) collecting information related to two or more concepts being used together on one or more social media networks; (a3) collecting content-based information; and (a4) collecting account-based information.

According to yet another illustrative embodiment utilizing the concepts described herein, a method for measuring influence of a narrative on a social media network may include: receiving a plurality of observed outcomes of interest; identify a context of interest to measure influence on; identifying a narrative related to the context of interest; and determining a quantitative influence of the narrative from the narrative to the context of interest, the quantitative influence of the narrative comprising a quantitative difference between observed outcomes in the context of interest and counter-factual outcomes in the context of interest, wherein the counter-factual outcomes comprises estimated outcomes with an absence of the influence of the narrative.

In embodiments, the counter-factual outcomes may comprise at least one of: the estimated outcomes with a total absence of the narrative; the estimated outcomes with an absence of a specific individual account; and the estimated outcomes with an alternate network structure.

In embodiments, determining a quantitative influence of the narrative may comprise: identifying one or more source nodes; quantifying exposure of the identified narrative by the one or more source nodes; quantify individual baseline outcomes, wherein the individual baseline outcomes comprise outcomes with an absence of the influence of the narrative; and determining a difference between the quantified exposure of the identified narrative and the quantified individual baseline outcomes.

In embodiments, determining a quantitative influence of the narrative may use Poisson generalized linear model (GLM).

In embodiments, determining a quantitative influence of the narrative may be performed using a formula of: log $\lambda_i = \tau Z_i + (\Sigma_{n=1}^{N_{hop}} \Pi_{k=1}^{n} \tau \gamma_k s_i^{(n)}) \beta^T x_i + \mu + \varepsilon_i$, in which $\tau Z_i$ is the primary effect on the source i, $\Sigma_{n=1}^{N_{hop}} \Pi_{k=1}^{n} \tau \gamma_k s_i^{(n)}$ is the accumulative social influence effect from n-hop exposures $s_i^{(n)}$ to the source, where each coefficient $\gamma_k$ captures the decay of the effect over each additional hop, $\beta^T x_i$ is the effect of the unit covariates $x_i$ including the potential social confounders, $\mu$ is the baseline effect on the entire population, and $\varepsilon_i$ is an independent and identically distributed variation.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which:

FIG. 9 is an illustrative tag cloud of a social network highlighting potentially influential narratives to be used as an illustrative influence quantification of narratives/accounts according to the concepts described herein;

DETAILED DESCRIPTION

Figure 1:
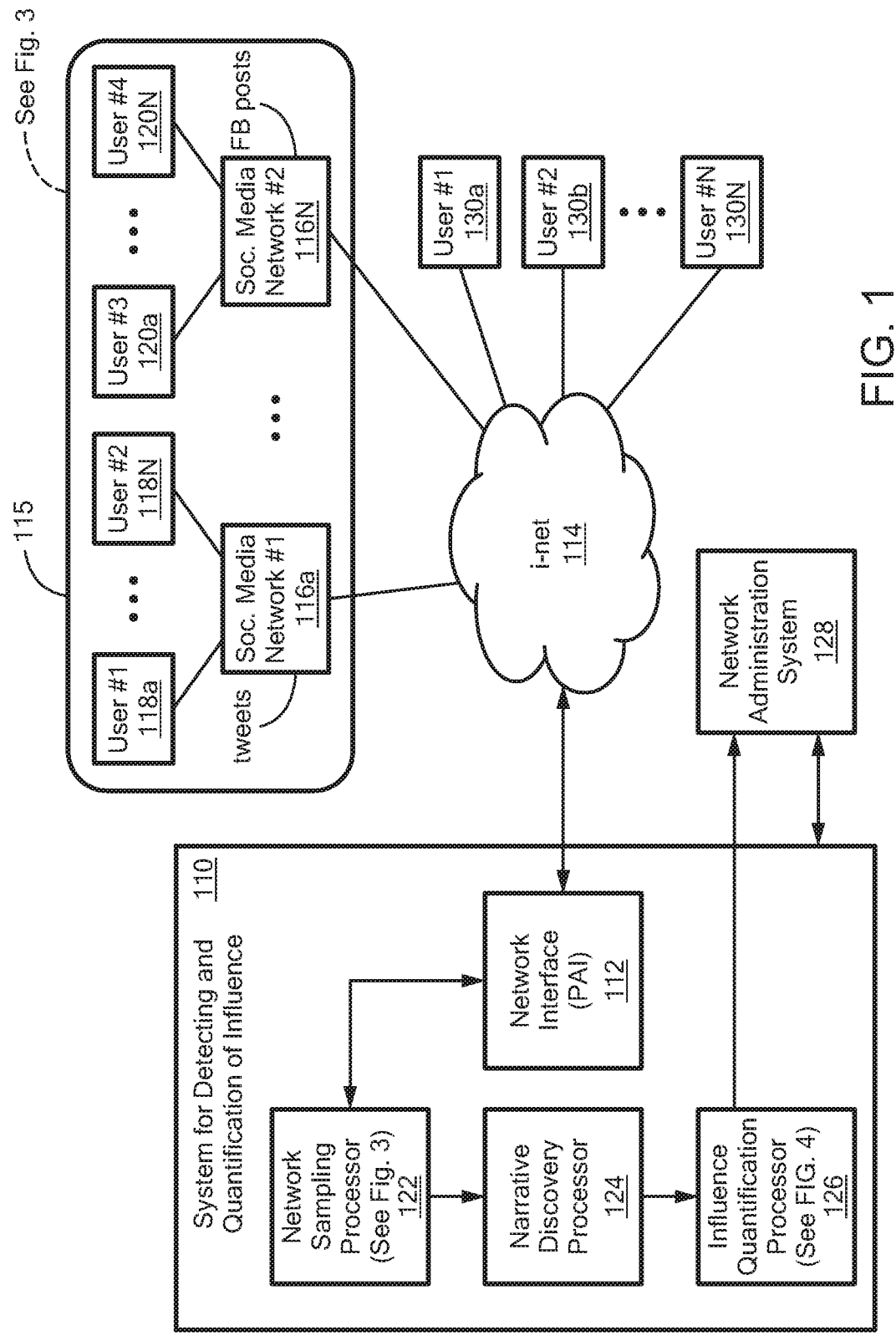
FIG. 1 is a block diagram of an illustrative system for detection and quantification of influence according to the concepts described herein.

Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term "narrative" is used to describe a particular topic or a sequence of events that is propagated in one or more social media networks. A narrative generally delivers a story, message or implication within a specific "context" (i.e., the circumstances that form the setting for an event, statement, or idea and in terms of which the event, statement, or idea can be fully understood). A narrative in social media networks may be identified by hashtags, keywords, hyperlinks, actors, locations, or a combination of these elements.

As used herein, the term "influence network" is used to describe a set of actors and their strength of influence on one another. The strength of influence may be mathematically represented as a weighted, directed graph where the nodes are the actors (e.g., Twitter account), and the edges are the strength of influence. The true influence network is typically not directly observable but can be characterized (e.g., as a prior probability distribution) from observed interaction (e.g., retweets and mentions) or relational (e.g., friends and followers) data between the actors.

As used herein, the term "estimand" refers to a mathematically defined quantity of interest to be estimated. In the context of the inventive concepts described herein, an estimand is a quantity on the causal effect of interest.

As used herein, the term "network causal estimand" refers to a quantitative difference between outcomes under exposure condition A via the network and outcomes under a different exposure condition B. Outcomes can be observed under the condition that happened, and outcomes under the condition that did not happen cannot be observed. The unobserved outcomes need to be estimated in order to establish the counter-factual for causal inference.

A "counter-factual" is an alternative outcome (i.e., what ifs), when contrasted against the outcome under the treatment or exposure of interest, establish the causal effect of that treatment or exposure. Counter-factual outcomes are often not realized nor directly observable (i.e., different from 'factual'). In a social media experiment or observational study, the outcomes are generally observed under the presence of a specific narrative participated by a set of accounts. Counter-factuals and the corresponding causal effects include, but are not limited to: (1) outcomes under the total absence of the narrative (in this case the question of interest is: "What is the causal impact of the narrative?"); (2) outcomes under the absence of one or more specific individual accounts (in this case the question of interest is: "What is the causal impact of the one or more specific accounts?"); and (3) outcomes under an alternate network structure (in this case the question of interest is: "What is the causal impact of changing the network structure?").

An "estimator," is a function used to obtain, from a given data set, an 'estimate' or 'estimated value' on the estimand of interest.

As used herein, the term "causal inference" means quantifying of effect from exposure to treatment or intervention (i.e., a quantified value of effect on a user from exposure to an intentional or unintentional action of one or more other users in one or more social media networks).

The term "network causal inference" means quantifying the causal effect of exposures to one or more narratives via an influence network (i.e., a quantified value of the causal effect on a user from exposures to a narrative via an influence network).

It should be appreciated that in conventional causal inference (i.e., "regular" causal inference) where influence is created from a person-to-person interaction, the outcomes of individuals only depend upon their own treatment (i.e., may only depend upon their own direct exposure to the actions of other users).

In network causal inference, on the other hand, the outcomes of individuals may depend upon treatments on others in a social media network due to influence (i.e., the outcomes of individuals may depend upon the influence of other individuals in the network because the influence on one individual may affect (e.g., influence) others due to the propagation of a narrative).

Referring now to FIG. 1, a system for detection and quantification of influence 110 comprises a network sampling processor 122, a narrative discovery processor 124, and an influence quantification processor 136. The system may also comprise a network interface 112 to communicate to one or more social media networks 116*a* . . . 116N and users 130*a*, 130*b*, . . . 130N via a network such as an internet 114. In a group of social media networks 115, there may be various social media networks or platforms 116*a*, . . . 116N. For example, the social media networks may comprise Facebook (and its associated Facebook Messenger), YouTube, WeChat, Instagram, QQ, QZone, Weibo, Twitter, Tumblr, Telegram, Reddit, Baidu Tieba, LinkedIn, LINE, Snapchat, Pinterest, Viber, VK, or any other social media network.

A plurality of users 118*a*, . . . 118N and 120*a*, . . . 120N may connect to one or more of the social media networks respectively. Some of the users are connected to multiple ones of the social media networks. User #2 118N, for example, is connected to both the social media network #1 (e.g., Twitter) and social media network #2 (e.g., Facebook).

Such connections may or may not be concurrent. The users may submit a post on one or more of the social media networks to which they are connected (e.g. a post on Facebook or a tweet on Twitter). The users also may read posts and/or tweets and/or receive other information (all collectively referred to as "information") by other users via the various social media networks to which they are connected. Information from one user may influence behavior, ideas and/or opinions of other users. Some of the users, for example, user #1 130a and user #2 130b, may communicate via the internet 114 using a different communication method other than the social media networks (e.g., e-mail). Also, user #1 130a and user #2 130b may interact offline and provide influence on each other or user #1 130a may e-mail information received from one or more social media networks to user #2 130b. Furthermore, some of the users, for example, user #N 130N, may access the internet 114 and not connect to any social media networks. User not connecting to or not accessing or otherwise participating in social media may not be directly influenced in a significant way (and perhaps not influenced at all) by information posted or otherwise made available on social media networks.

The network sampling processor 122 may sample or gather information on the one or more social media networks 116a, . . . 116N via its network connection (e.g., an internet connection) to the one or more social media networks. In embodiments, the network sampling processor 122 may be coupled to the internet 114 through a network interface 112. In embodiments, the network sampling processor 122 may sample information from the social media networks via the network interface 112 using methods provided by the social media networks (e.g., API or Web Services) or any other suitable methods.

The narrative discovery processor 124 is coupled to the network sampling processor 122 and receives information sampled by the network sampling processor 122. The narrative discovery processor 124 may analyze the sampled information and identify a narrative related to a subset of information using any number of techniques including, but not limited to the techniques described hereinbelow.

The influence quantification processor 126 is coupled to the narrative discovery processor 124 and receives a discovered narrative along with the sampled information (including sampled information pertaining to the discovered narrative) on the one or more social media networks 116a, . . . 116N. The influence quantification processor 126 then analyzes the discovered narrative using the sampled information to determine the influence or impact of the narrative on the users of the various social media networks. In embodiments, the influence quantification processor 126 may use a network causal influence process to quantify the influence. Such a network causal influence process will be described in detail hereinbelow. In embodiments, such quantification may be in the form of a numerical value or probability distribution indicative of the amount of influence of a narrative.

When a value of the quantified influence exceeds a pre-defined threshold, the influence quantification processor 126 may determine that there is a material or critical influence (hereinafter a "material influence"). The influence quantification processor 126 may then inform a network administration system 128 or another control system that one or more narratives may cause (or be causing) a material influence on one or more social media networks. In addition, the system for detection and quantification of influence 110 may provide actionable information related to the narrative to the network administration system or 128 (or to some other control system or controller), and in response thereto the control system may take action. In embodiments, the network administration system 128 may comprise a human operator or a monitoring system operated according to pre-defined rules.

Many social media interactions (and in some cases, a vast majority of social media interactions) are irrelevant to a context of interest for influence estimation. For example, there may be many social interactions during the period of the 2017 French Election (an illustrative context of interest), which are not related to the French Election. Therefore, the network administration system 128 may need to perform an appropriate sampling to distinguish relevant social media interactions from irrelevant social media interactions. Ideally, the sampling mechanism must efficiently capture relevant examples of both the influence network and associated contents. Described herein is a content-based approach for network graph sampling. In embodiments, the content-based approach is based on a hypothesis that there is likely an influence campaign intending to generate influences that may change the outcomes in the context of interest. The campaign may be an organized activity by one or more individuals or organizations. Alternately, a non-planned campaign may be created from combinations of unorganized activities. For example, with the 2017 French Election, one or more campaigns may be created to help or oppose a candidate.

The content-based approach for network graph sampling starts with identifying potentially relevant social media content and/or user account. Such relevant social media content and/or user account may be identified, for example, using prior knowledge and subject matter expertise about the targeted context. Alternatively, the relevant social media content and/or user account may be identified by observing trends in news media or communications between people. Further, any other suitable methods may be used to identify the relevant social media content and/or user account. Such relevant social media content may be indicated, for example, by hashtags, keywords, actors, hyperlinks, locations, or a combination of thereof. Then, publicly available information associated with the potentially relevant social media content and the user account is collected. The relevance of a set of hashtags, keywords, and user account are determined based on how much these contents are aligned with a hypothesized influence campaign. For example, the relevance of hashtags or keywords in the context of French Election may be determined based upon how the hashtags or keywords are related to a hypothesized influence campaign for (or against) a candidate. Third, graph sampling is performed by selectively collecting content prioritized based on the estimated effect (or a threat) to the outcomes in the context of interest.

Figure 2:
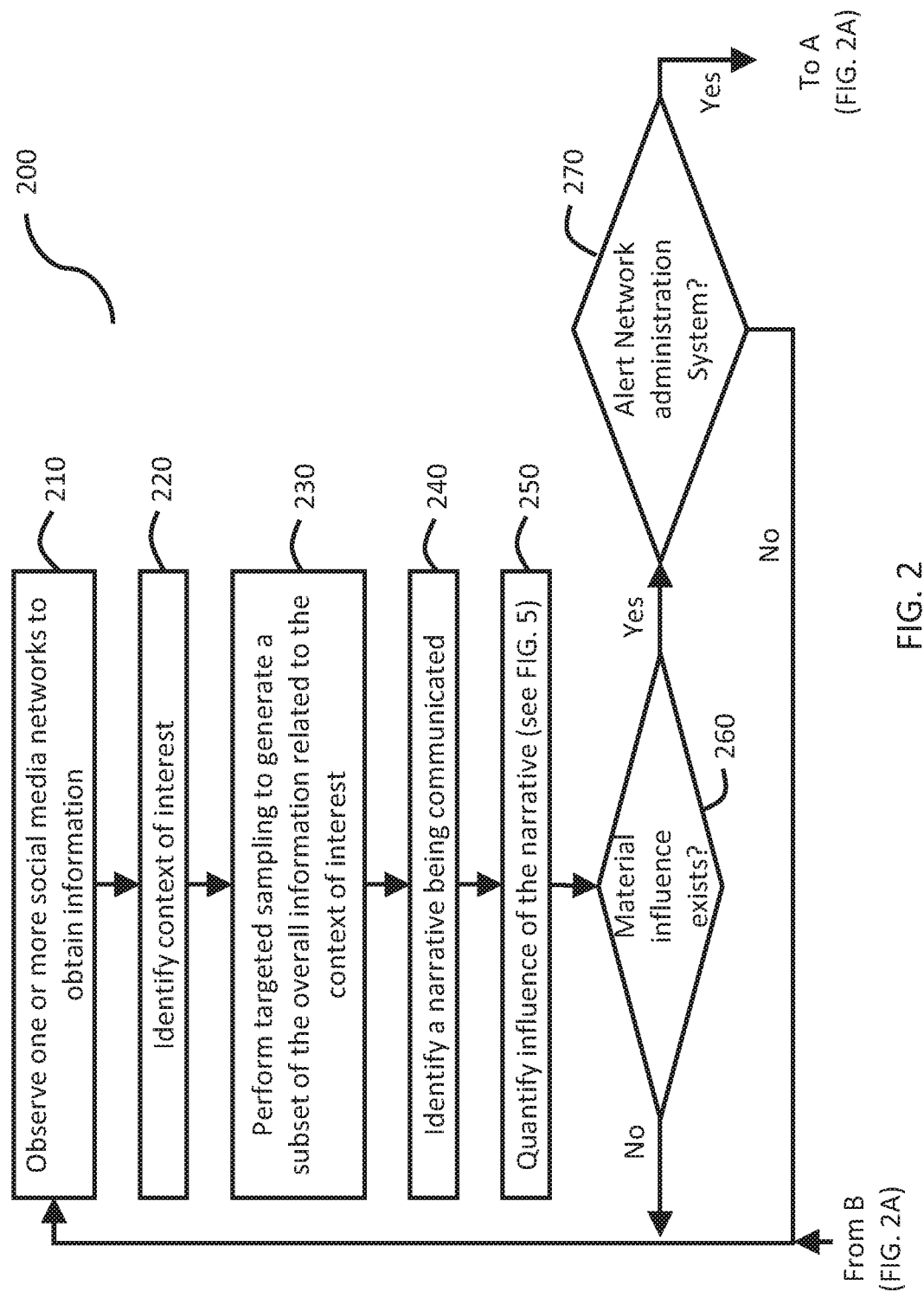
FIGS. 2 and 2A are flowcharts of a process for detection and quantification of influence according to the concepts described herein.
Figure 2A:
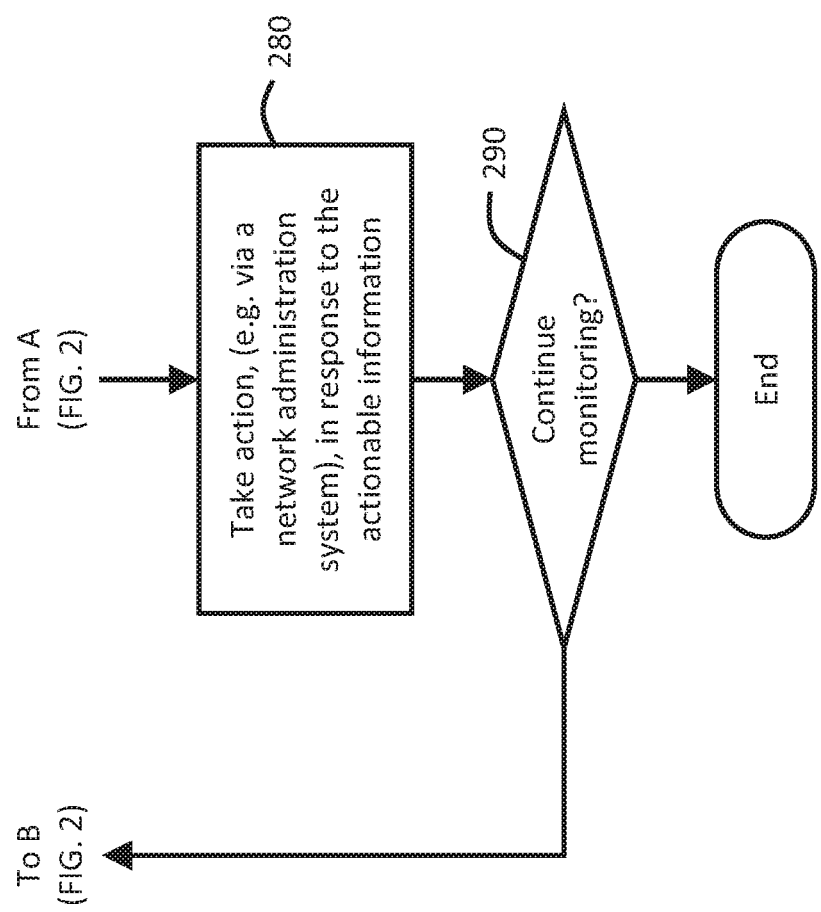
Figure 5:
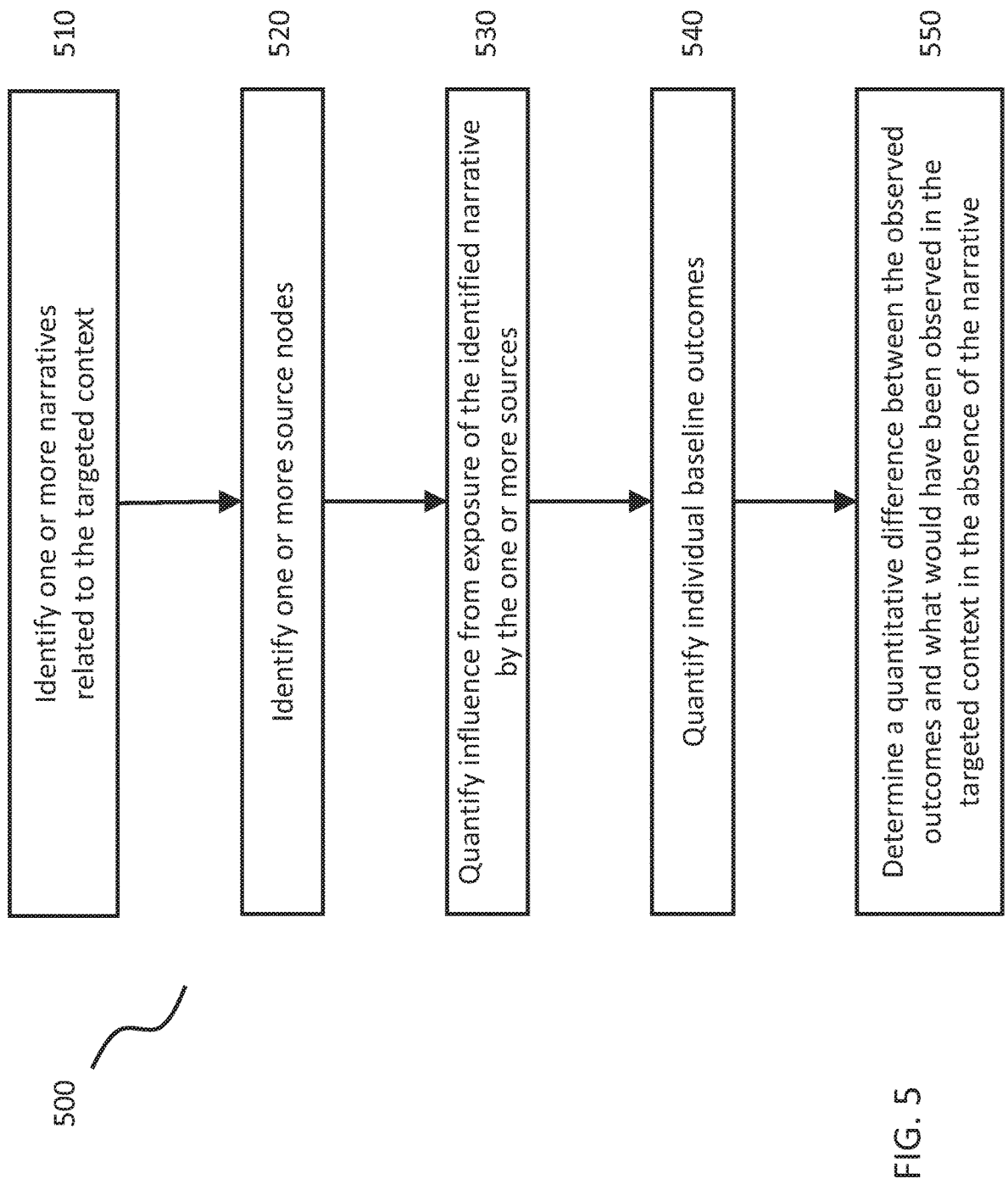
FIG. 5 is a flowchart of a process for quantification of the influence of narratives/accounts according to the concepts described herein.

FIGS. 2, 2A, 5 are flow diagrams illustrating the processing performed by a system for detection and quantification of influence (for example, system 110 described above in FIG. 1). Rectangular elements (typified by element 210 in FIG. 2), herein denoted "processing blocks," represent computer software instructions or groups of instructions and diamond shaped elements (typified by element 260 in FIG. 2), herein denoted decision blocks represent computer software instructions or groups of instructions which affect the flow of the processing blocks. The processing blocks may represent processes performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

In FIG. 2, described is a process for detection and quantification of influence which may be performed, for example by a system for detection and quantification of influence such as system 110 described above in conjunction with FIG. 1.

Referring now to FIG. 2, a process 200 for detection and quantification of influence includes processing block 210 in which one or more social media networks (e.g., 116a in FIG. 1) are observed to obtain information on the one or more social media networks. Such observations may be made, for example, using a system for detection and quantification of influence such as system 110 described above in conjunction with FIG. 1. The system 110 may obtain the information via the internet through a network interface (e.g., interface 112 in FIG. 1).

In processing block 220, a targeted context may be identified. Social influence generally occurs within a specific context (such as the 2017 French election or the 2016 United States presidential election, for example). Thus, a "context of interest" (or sometimes referred to as "targeted context") may be a context to be analyzed to determine whether an actor exerted a material influence on an outcome. In embodiments, the context of interest may be determined, for example, by a user of a system such as a system 110. Alternately, a specific context may be determined based upon pre-defined rules or by executing an artificial intelligence (AI) algorithm. As can be appreciated by those of ordinary skill in the pertinent art, there may be various suitable ways to identify a targeted context.

In processing block 230, targeted sampling (i.e., filtering information) is performed to generate a subset of the overall information related to the targeted context. The obtained information from the one or more social media networks is filtered based upon an identified context. In embodiments, the sampling may be performed by text searching for one or more keywords and/or utilizing natural language topic modeling approaches to focus on a specific context and/or community detection approaches to filter the graph and/or some combination of these approaches. In other embodiments, any other suitable approaches may be used to sample information related to the targeted context.

In processing block 240, one or more narratives that are being communicated on the one or more social media networks are identified. Such identification may be accomplished, for example, via a narrative discovery processor such as the narrative discovery processor 124 described above in conjunction with FIG. 1. The narratives may comprise, for example, one or more of keywords, topics, or hashtags frequently appearing on the one or more social media networks. Such frequent appearances may indicate that the narratives have a material influence on the targeted context. For example, a hashtag #MacronLeaks that refers to thousands of leaked documents may be a narrative in the context of the 2017 French election. The #MacronLeaks narrative has dominated election-related social media discussions at the end of the election.

In embodiments, one or more narratives may be identified based upon prior knowledge and subject matter expertise about the targeted context. Alternately, some other methods may be used, such as counting the most frequently mentioned hashtags or using a community detection method such as an Infomap clustering method. Information in social media networks tends to show homophily (meaning the tendency for people to seek out or be attracted to those who are similar to themselves) in their network representations: nodes with similar properties tend to form highly connected groups called communities, clusters, or modules. Using the tendencies, one or more communities of information may be detected. Each of these one or more communities of information may be a narrative to the context of interest. Further, any other suitable methods may be used to identify one or more narratives that may have a material influence in the targeted context. For example, the narrative discovery processor 124 may identify one or more social media accounts that produce or possibly produce a material influence in the targeted context.

In processing block 250, an influence quantification processor (e.g., 126 in FIG. 1) of the system 110 may estimate or quantify the influence of the narrative in the scope of the targeted context. A method for quantification of influence will be described in detail in conjunction with FIGS. 4-5.

In a decision block 260, a decision is made as to whether a material influence exists due to the identified narrative. In embodiments, a system (e.g., system 110 in FIG. 1) may determine whether the quantified influence of the narrative indicates that the narrative made a material influence on the social media networks. In embodiments, a system (e.g., the system 110 in FIG. 1) may determine whether a material influence exists by determining whether the value of the quantified influence of the narrative exceeds a pre-determined threshold value. If the value of the quantified influence exceeds the pre-determined threshold value, then the influence is deemed to be a material influence. While the system may determine a threshold to detect narratives of interest that produce a bigger (i.e., material) influence compared with other narratives that produce a small influence, it may be needed not set the threshold too low to avoid overwhelming the users of the social media networks. That is, the system may adjust the threshold value to avoid too many narratives being recognized as creating a material influence.

If, in decision block 260, a decision is made that the narrative does not produce or result in a material influence on the narrative, then processing returns to processing block 210 and continues observing social media networks. If, in decision block 260, a decision is made that a material influence does exist, then processing flows to decision block 270 in which a decision is made as to whether it is necessary to alert a network administration system (e.g., 128 in FIG. 1) or a control system. In some embodiments, the system (e.g. the system 110 in FIG. 1) may take some other action in response to the material influence caused by the narrative, such as issuing warnings to the users of a social media networks or suspension of the users who propagated the narrative (particularly when the narrative is determined to be false). In embodiments, these actions need to be confirmed and approved by the network administrators. If in decision block 270, decision is made not to take any action (e.g., to not alert a system administration system), then processing again flows to processing block 210.

In embodiments, if a decision is made to take action (e.g., to alert a network administrator) in decision block 270, the system may send an alert signal. Such an alert signal may be sent, for example, to a system user or a network administrator. Alternatively or in addition to providing an alert signal, actionable information related to the narrative may be sent to a user or a system administrator. The actionable information may include, for example, an identifier of an influential account or detailed contents of a narrative.

Processing may then proceed to processing block 280, and a control system or a system administrator may take action in response to actionable information provided thereto. For example, a system administrator may inform related organizations or authorities about the influence. Alternately or in addition to informing a system administrator, information may be sent to an owner or creator of an influential account. In other embodiments, information may be sent to an owner or creator (e.g., an originator) of a narrative being affected.

If it is determined that an influential account is abusing or otherwise misusing or taking advantage of one or more social media networks (e.g. by originating or propagating incorrect or false information via the one or more social media networks), a administration system or a control system may request or instruct the social media network(s) to take an action for the account (e.g., preventing the account from contributing to a certain narrative or even by totally banning the account from one or more social media network(s)).

Processing then proceeds to decision block 290, in which a decision is made as to whether it is necessary to continue monitoring of the one or more social media networks. If it is determined that continuous monitoring is needed, then processing may return to processing block 210 to continue observing one or more social media networks.

Figure 3:
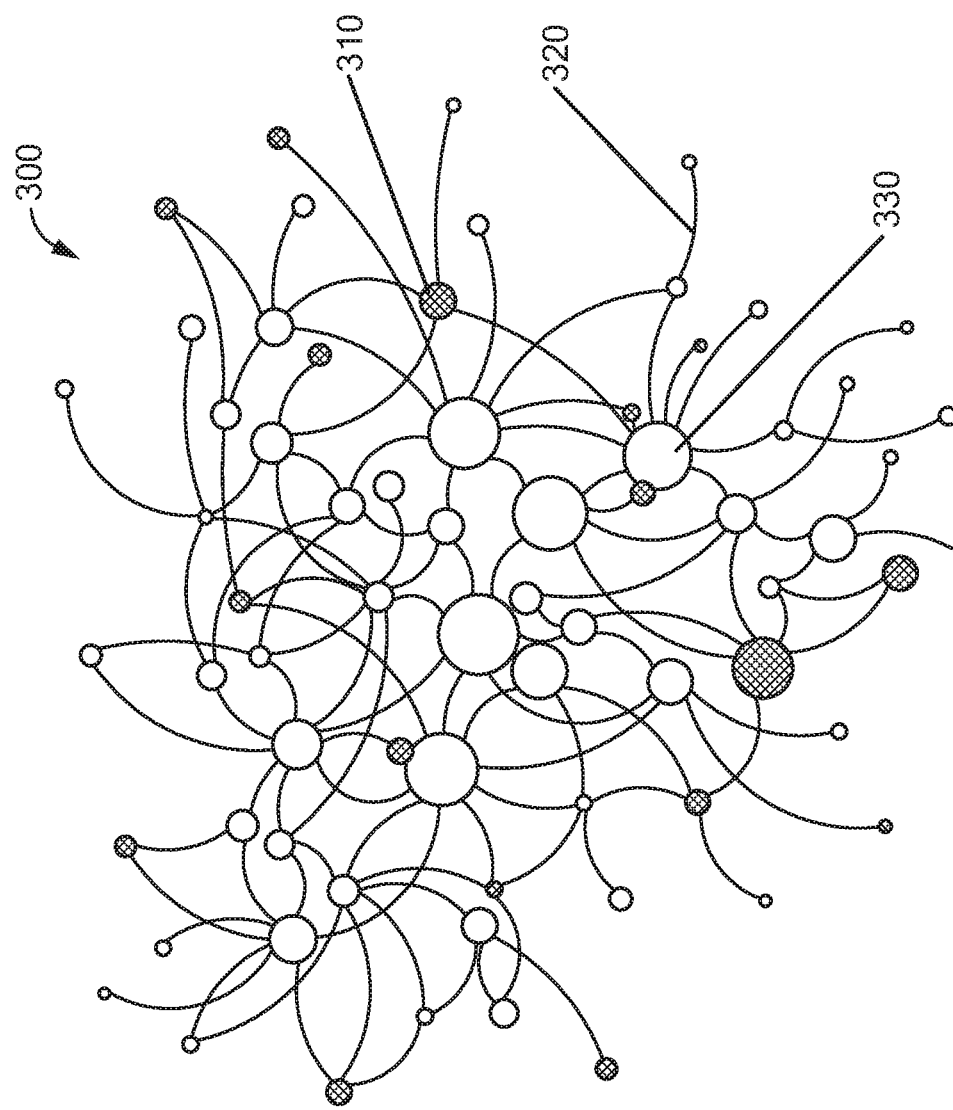
FIG. 3 is an illustrative figure that shows a conceptual representation of source nodes and a narrative network.

Referring now to FIG. 3, an illustrative graphical representation of an influence network 300 (also referred to hereinafter as an "influence graph") includes a plurality of nodes (with two nodes being specifically identified via reference numerals 310, 330). Each of the nodes in influence network 300 (e.g. nodes 310, 330) may represent an account on social media networks. Based on the information collected from the social media networks, the nodes in the influence network may be generated. For example, when a tweet from an account that is not in the influence network 300 is found, the account is added to the influence network 300. When a tweet from the account that is already added to the influence network 300 is found, the number of tweets from the account is incremented, which results in a bigger node size.

The nodes with darker color 310 may correspond to identified narratives or accounts that may generate a material influence. Such narratives or accounts may be identified, for example, by a system for detection and quantification of influence (e.g., such as system 110 described above in conjunction with FIG. 1). Node sizes may indicate how "active" the nodes are. For example, the size of the nodes may represent or correspond to a number of tweets on Twitter from a corresponding user account. In this example, as an account posts more tweets, the size (e.g. area or diameter) of the corresponding node in influence graph 300 grows larger.

It should be noted that the amount of activity of a node does not necessarily indicate a degree of influence for the nodes. For reasons which will become apparent from the description provided hereinbelow at least in conjunction with FIGS. 8 and 10, it is possible for an account 310 posting a smaller number of tweets have more influence than another account 330 posting a number of tweets which is larger than the number of tweets posted in an account 310. If a small number of tweets posted by the account 310 may be retweeted much more than the tweets from the account 330. The lines or edges 320 between the nodes represent influence between nodes. In this figure, only the more influential relations 320 are drawn as edges, but in general, it should be recognized that any node in the network may influence any other node (i.e., in embodiments, it is possible to have connecting edges between every node). The edges in the influence graph 300 are mostly bi-directional. That is, information may be exchanged in either direction between the nodes. It should be noted, however, that some of the edges may be unidirectional. Some of the nodes (i.e., user accounts) may only receive information from other nodes.

There are various conventional approaches to quantify influence, including topological, node degree or activity, diffusion, cascade lengths, among other approaches. Though each of these approaches is informative and may correlate with influence, they do not necessarily indicate actual network influence within a context of interest. For example, an account that posts a small number of tweets can be substantially influential or another account that posts a large number of Facebook postings actually can have minimal influence on social media networks. Such situations are not identified by conventional techniques for quantifying influence.

Figure 4:
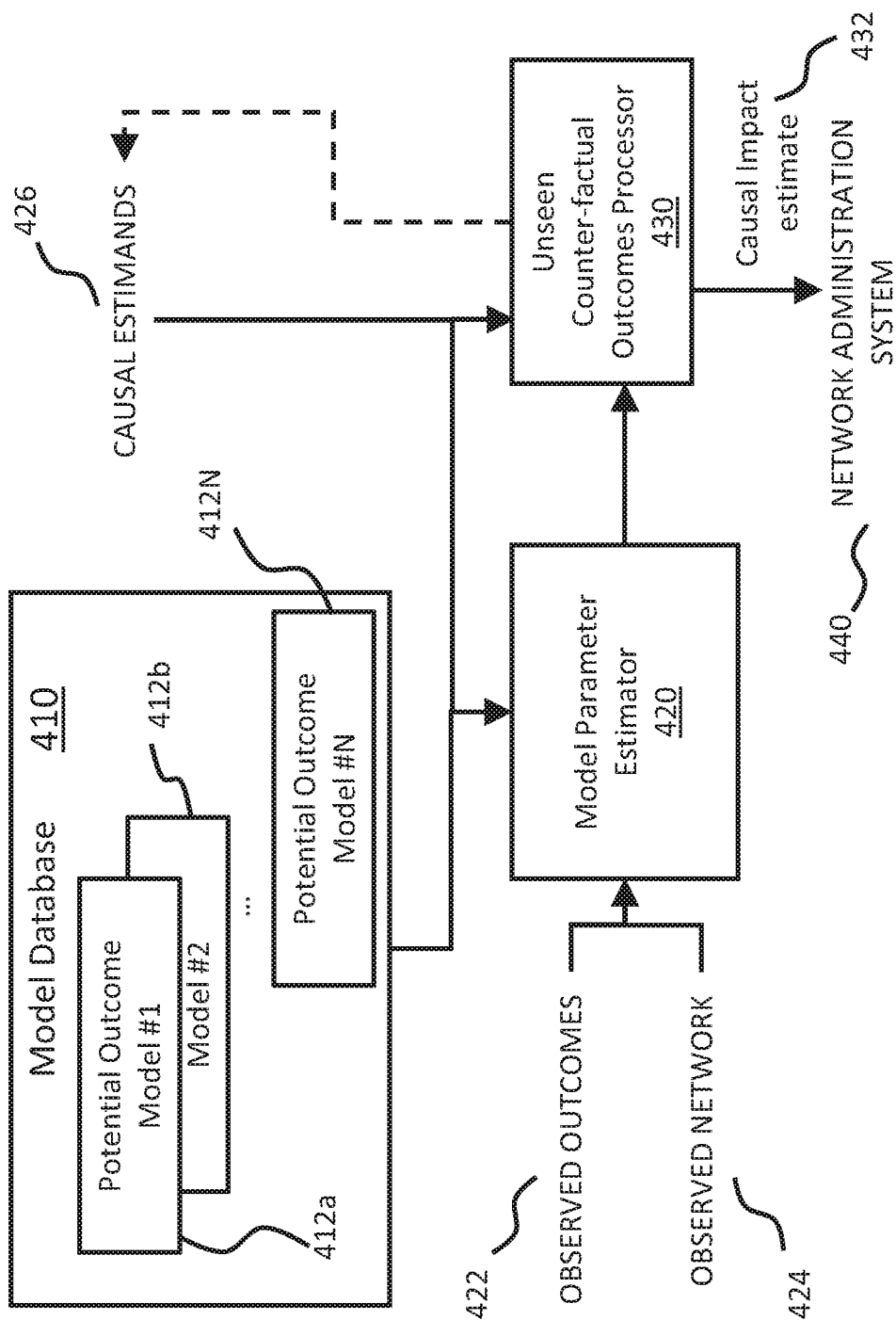
FIG. 4 is an illustrative block diagram of a system for quantification of the influence of narratives/accounts according to the concepts described herein.

Referring now to FIG. 4, an influence quantification system 400 which may be used, for example, in a system for detection and quantification of influence of narratives/accounts (e.g., system 110 described above in conjunction with FIG. 1)) includes a model database 410, a model parameter estimator 420 and an unseen counter-factual outcomes processor 430. The model database 410 comprises one or more potential outcome models 412a, 412b, . . . 412N. Each model 412a, 412b, . . . 412N corresponds to a potential outcome for each set of data provided thereto. For each application and type of outcome, a model appropriate to capture the features that affect outcomes is selected. The selected model needs to be appropriate to capture the main effect of the treatment, social effects of exposures to the treatment, and the effects of any treatment and social confounders, which will be described below in conjunction with FIG. 6. In addition, the selected model also needs to fit the data sufficiently well, which may be verified through rigorous model checking such as the posterior predictive checks. The selected model is used as an input to a model parameter estimator 420. In embodiments, the model parameter estimator uses observed outcomes 422 and information on observed network 424 in addition to the selected model and one or more causal estimands 426 to estimate, from a given data set, the posterior distributions of the model parameters, which are then used to generate the posterior distributions of the final estimate of the causal estimand. For more robust estimation in the presence of model mis-specification, the model parameter estimator may sub-sample and reweight the observed outcomes in order to achieve a better balance of the confounders between nodes under different treatment exposure conditions in the causal estimand.

The one or more causal estimands 426 are the quantitative values representing the causal impact of interest, which comprises the potential outcomes that either are observed or need to be estimated (i.e., the counter-factuals). Accordingly, the causal estimands 426 are input to the model parameter estimator 420 and the unseen counter-factual outcomes processor 430. In return, the output of the model parameter estimator 420 and the unseen counter-factual outcomes processor 430 provide the resultant estimates on the causal estimands 426 determined from the quantification process that will be described in detail in conjunction with FIG. 6.

Model parameter estimator 420 provides the estimated parameters to an unseen counter-factual outcomes processor 430. In response to the data provided thereto, unseen counter-factual outcomes processor 430 determines a causal impact 432 using the techniques described herein (e.g., at least in conjunction with FIGS. 5-10 below). The causal impact 432 may be sent to a network administration system 440 or other controllers as described at least in conjunction with FIGS. 2-2A.

Referring now to FIG. 5, a process 500 for quantifying a causal influence of a narrative or an account is presented. The process 500 describes the procedure for quantifying the influence of a narrative (e.g., processing block 250 in FIG. 2) in detail. Such a process 500 may be executed by an influence quantification processor such as processor 126 (in FIG. 1) described above in conjunction with the description of a system for detection and quantification of influence (e.g., a system 100 in FIG. 1). When the system (100 in FIG. 1) observed and obtained information on one or more social media networks and a context of interest is identified (e.g., processing blocks 210-230 in FIG. 2), processing may then proceed to processing block 510 (also processing block 240 of process 200 in FIG. 2) to identify one or more narratives related to the context of interest.

Once one or more narratives are identified, processing may then proceed to processing block 520 in which one or more source nodes in an influence network (e.g., node 300 in FIG. 3) that propagate the identified narratives are identified. The source nodes may be one or more influential accounts in social media networks. In embodiments, for example in Twitter, accounts posting substantially more tweets related to the narratives than other accounts may be considered as source nodes. Alternately, accounts posting tweets that are frequently retweeted may be considered as source nodes. In some embodiments, combinations of these methods may be used to identify one or more source nodes. For example, the system (100 in FIG. 1) may identify Twitter accounts frequently tweeting about #MacronLeaks in the context of the 2017 French Election as source nodes for the #MacronLeaks narrative. Alternately, the system may identify accounts posted one or more tweets about #MacronLeaks that are retweeted frequently as source nodes, or the system may use combinations of a number tweet/retweet to identify source nodes.

In processing block 530, influence from exposure of the identified narratives by the one or more source nodes is quantified. The conceptual model to quantify the influence is described above in conjunction with FIG. 4. A potential outcome model (e.g., potential outcome model #1 412a in FIG. 4) that is appropriate to the given model is selected. Using the selected model, based upon the observed outcomes (e.g., 422 in FIG. 4) and observed network (e.g., 424 in FIG. 4), parameters for the model are estimated. The parameter estimation may be performed by a model parameter estimator (420 in FIG. 4). The estimands (e.g., 426 in FIG. 4) and other results from the parameter estimation may be used to quantify the influence from the one or more narratives. The quantification may be performed by an unseen counter-factual outcomes processor (430 in FIG. 4). In embodiments, the conceptual model described in FIG. 4 may be implemented by the formulas described in detail in conjunction with FIG. 6.

In processing block 540, individual baseline outcomes may be quantified. The 'individual baseline outcomes' are the outcomes that would occur without exposure to the narrative (i.e., without the influence of the exposure to the narratives). For example, the 'individual baseline outcomes' in the context of the 2017 French Election is the expected outcomes of the French Election assuming that there was no #MacronLeaks narrative. The contributing factors to the individual baseline outcomes are the individual traits and characteristics of each of the node in the network (i.e., the individuals in the population of interest). In embodiments, contributing factors to the individual baseline outcomes are individual traits and characteristics. It is necessary to include confounding factors that are correlated both to the individual baseline outcomes and to the network exposure condition. For example, community membership, activity levels, language, and other characteristics that affect network structure (i.e., the topology and shape of the network) should be included. It is known that nodes that belong to the same community and language group tend to interact more frequently among themselves, which forms clusters in the network structure. Further, the nodes with a high activity level tend to become high-degree nodes (i.e., hubs) in the network, which produce influences to more nodes in the group than the nodes with a low activity level.

In processing block 550, a quantitative difference between the observed outcomes and the individual baseline outcomes indicating what would have been observed in the targeted context in the absence of the narrative may be determined. The quantitative difference represents how much influence is created from the exposures to the identified narratives. For example, influence from leaking documents related to a primary candidate in an election may be quantified.

Figure 6:
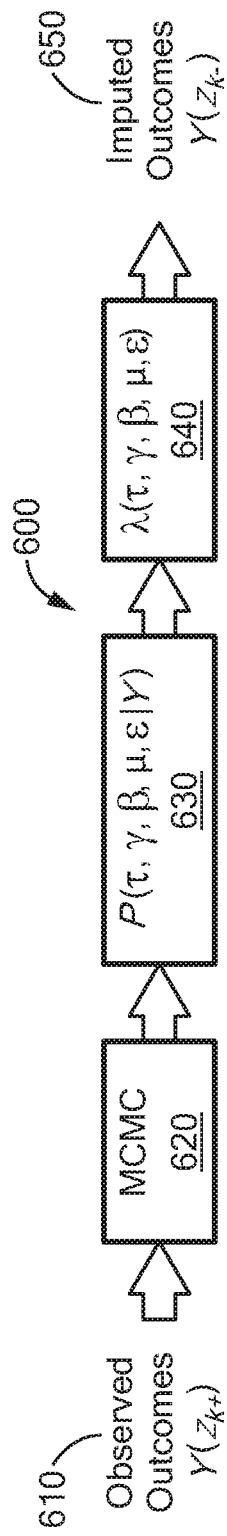
FIG. 6 is a process diagram for a specific implementation of a process for quantification of the influence of narratives/accounts according to the concepts described herein.

Referring now to FIG. 6, a flow diagram 600 for a specific implementation of a process for quantification of the influence of narratives/accounts is presented. The conceptual model for quantification of the influence of narratives/accounts is described above in conjunction with FIG. 4. As can be appreciated by those of ordinary skill in the pertinent art, there may be various suitable approaches to quantify the influence of narratives/accounts. Herein, a network potential outcome is modeled using a Poisson Generalized Linear Model (GLM) as a specific implementation of the quantification process. The GLM process 600 starts with collecting observed outcomes 610 which are denoted $Y_i(Z_{k+})$. Herein, $Y_i$ represents outcomes of unit i and $Z_{k+}$ represents exposure of a narrative k (k+) on the unit i. An action including an exposure of a narrative on a unit is sometimes referred to as 'treatment' on the unit.

In element 620, a Markov Chain Monte Carlo (MCMC) process 620 is applied for sampling from a probability distribution of the observed outcomes. Herein, constructing a Markov chain that has the desired distribution may enable obtaining a sample of the desired distribution by observing the chain after a number of steps. After constructing the Markov chain, Joint Bayesian inference of the model parameters $\tau$, $\gamma$, $\beta$, $\mu$, and the social influence matrix A is done through Monte Carlo Markov Chain and Bayesian regression 630, which is denoted $P(\tau, \gamma, \beta, \mu, \varepsilon|Y)$. Herein, $\tau$ represents a parameter for the primary effect on the source nodes, $\gamma$ represents accumulated social influence on the source nodes, $\beta$ represents the effects of the unit, and $\mu$ represents the effect on the baseline. The parameters $\tau$ and $\gamma$ are used to model the exposure to the source nodes and the parameters $\beta$ and $\mu$ are used to model individual baseline outcomes. After that, the results from the Bayesian inference is used to quantify the influence estimate 640, which is denoted $\lambda(\tau, \gamma, \beta, \mu, \delta)$. Based on the quantification, imputed outcomes 650, denoted $Y_i(Z_{k+})$, is provided as an output of the process 600.

The specific implementation method of FIG. 6 is described in detail below. In embodiments, observed interactions between the nodes (e.g., nodes 310, 330 in graph 300) may be modeled as G=(V,E) with N nodes V={$v_1$, $v_2$, ..., $v_N$}, whose edges are denoted by the observed interactions between $v_1$ and $v_j$. In addition, A=($a_{ij}$) may represent an N-by-N random matrix of social influence of $v_i$ on $v_j$ with Poisson rate determined by the graph data G and Z represents a binary N-vector of narrative sources (i.e., treatment vector). The fundamental quantity is the network potential outcome of each individual node, denoted $Y_i(Z, A)$, under exposure to the narrative through the source vector Z and influence network A. In the analysis below, nodes are user accounts in the narrative network (i.e., social media networks relative to the targeted context), edges are retweets of a specific narrative, and the potential outcomes are the number of tweets in the narrative. The impact $\zeta_i$ of each node i on the narrative is defined as the causal estimand of interest, using the network potential outcomes $Y_j$ on each node j in the network of population size N, in formula (1), $$\zeta_i(z) = \frac{1}{N}\sum_{j=1}^{N}(Y_j(Z=z_{i+}, A) - Y_j(Z=z_{i-}, A)) \quad (1)$$

This causal estimand above is the average difference between the individual outcomes under two different exposure conditions, specifically with $v_i$ as a source subject to $z_{i+}=(z_1, \ldots, z_i:=1, \ldots, z_N)^T$, versus $v_i$ without a source subject to $z_{i-}=(z_1, \ldots, z_1:=0, \ldots, z_N)^T$. That is, influence on each individual outcomes are quantified, and the average difference from the influence is calculated as the causal estimand. This impact is the average (per node) number of additional tweets generated by node i participation. The source is referred to be uniquely impactful when the node i is the only source considered. As described above in conjunction with FIG. 4, potential outcomes on each node j can be observed under one exposure condition but not the other, so estimates on this causal estimand need to be generated via the process described in conjunction with FIG. 4.

In embodiments, observing the outcomes at each node with both exposure conditions under source vectors $z_i+$ and $z_i-$ may require too much effort. Therefore, the missing potential outcomes can be estimated by modeling the potential outcomes. After estimating the model parameters on the observed outcomes and node covariates, missing potential outcomes in the causal estimand $\zeta_i$ can be imputed using a model that fits the database. Accordingly, a potential outcome model (e.g., 412a in FIG. 4) may be selected from a model database (e.g., 410 in FIG. 4).

In embodiments, potential outcomes may be modeled using a Poisson generalized linear model (GLM) with the canonical log link function and linear predictor coefficients ($\tau, \gamma, \beta, \mu$) corresponding to the source indicator $Z_i$, n-hop exposure vector $s_i$, the covariate vector $x_i$, and the baseline outcome. The covariate vector $x_i$ has m elements corresponding to the number of observed or inferred covariates on each node, including the potential social confounders such as popularity and community membership. The GLM model for the potential outcomes is calculated with the following formula (2). The potential outcome (log $\lambda_i$) is calculated as:

$$\log \lambda_i = \tau Z_i + (\Sigma_{n=1}^{N_{hcp}}\Pi_{k=1}^n \tau\gamma_k s_i^{(n)})\beta^T x_i + \mu + \varepsilon_i \quad (2)$$

with $Y_i(Z,A) \sim \text{Poisson}(\lambda_i)$. Herein, $\tau$ represents a parameter for the primary effect on the source nodes, $\gamma$ represents accumulated social influence on the source nodes, $\mu$ represents the effects of the unit, and $\mu$ represents the effect on the baseline. The first term in the linear predictor $\tau Z_i$ represents the primary effect on the source. The second term $\Sigma_{n=1}^{N_{hcp}}\Pi_{k=1}^n \tau\gamma_k s_i^{(n)}$ represents the accumulative social influence effect from n-hop exposures $s_i^{(n)}$ to the source, where each coefficient $\gamma_k$ captures the decay of the effect over each additional hop. The third term $\beta^T x_i$ is the effect of the unit covariates $x_i$ including the potential social confounders such as popularity and community membership. For example, in the following analysis, these two confounders are used: popularity, based on node degree, and community membership, based on language. The fourth term $\mu$ is the baseline effect on the entire population. The last term $\varepsilon_i \sim \text{Normal}(0, \sigma_\varepsilon^2)$ provides independent and identically distributed variation for heterogeneity between the units. The amounts of social exposure at the $n_{th}$ hop are determined by $(A^T)^n Z$, which captures all exposure to the sources propagated on the influence network. In embodiments, the values of parameters $\tau, \gamma, \beta, \mu, \varepsilon$ may be defined by a model parameter estimator (e.g., 420 in FIG. 4).

Lastly, to model the diminishing return of additional exposures, the (non-negative) log-exposure is used in the formula of $S^{(n)}=\log((A^T)^n Z+1)$. In embodiments, joint Bayesian inference of the model parameters $\tau, \gamma, \beta, \mu$, and the social influence matrix A is done through Monte Carlo Markov Chain and Bayesian regression. In embodiments, the lower bound on the variance of the influence estimate may provide a quantity that indicates both the best precision achievable and provides geometric insight into the dependency of the influence estimate on both the data and parameters. The Cramer-Rao lower bound on the model parameter covariance is computed from the inverse of the Fisher information matrix of the proposed Poisson GLM in the formula (3).

$$F = -E_y[\partial^2 \ell(\tau,\gamma,\beta,\mu)/\partial(\tau,\gamma,\beta,\mu)^2] \quad (3)$$

where y are the observed potential outcomes and $\ell$ is the loglikelihood function. Herein, $\tau$ represents a parameter for the primary effect on the source nodes, $\gamma$ represents accumulated social influence on the source nodes, $\beta$ represents the effects of the unit, and $\mu$ represents the effect on the baseline. For the simplest form of the proposed Poisson GLM model with 1-hop exposure, a scalar node covariate, and conditional independence between nodes, the Fisher information matrix is, $$F = \sum_{i=1}^{N} \lambda_i \begin{pmatrix} \phi_i^2 & \phi_i \tau s_i^{(1)} & \phi_i x_i & \phi_i \\ & (\tau s_i^{(1)})^2 & \tau s_i^{(1)} x_i & \tau s_i^{(1)} \\ & & x_i^2 & x_i \\ & & & 1 \end{pmatrix}, \quad (4)$$

where $$\phi_i \stackrel{def}{=} Z_i + \gamma_1 s_i^{(1)}.$$

This matrix represents the information content on the model parameter from a given data set. The matrix also represents the precision with the estimated values from the quantification process under the given parameters.

In embodiments, the quantified influence may be calculated by an unseen counter-factual outcomes processor (e.g., 430 in FIG. 4). In embodiments, the precision of the impact estimates on $\zeta$ depends primarily on the variances of the primary effect coefficient r and the social effect coefficient $\gamma_1$ because the parameters drive the total effect of exposures to the sources. The inverse of this Fisher information matrix requires effort to interpret. However, the first and second diagonal terms ($F_{11}$ and $F_{22}$) of the information matrix quantify the information content on $\tau$ and $\gamma_1$, so maximizing these two terms may lead to smaller variances and therefore more precise impact estimates. By inspection, these two terms are maximized when units with large expected outcomes ($\lambda$) receive a large amount of peer exposures ($s^{(1)}$). Maximizing the two terms may happen when sources are on nodes with high out-degrees and clustered around nodes with large expected outcomes. The analysis described above may be one of the simplest models and also can be easily generalized to multi-hops and multi-node-covariate cases, with similar resulting intuition.

Illustrative analysis using real data is described below. The proposed causal inference approach aims to quantify influence by accounting for causal narrative propagation over the entire network, including the timing of the tweets and the position of the influencer in the network. The approach also accounts for several potential confounders (e.g., community membership, popularity) and removes their effects from the causal estimation. The impact of an individual account on the narrative network (e.g., FIG. 3 and FIG. 8) is defined as the average (per node) number of additional tweets generated by its participation. This impact is estimated using a network causal inference framework described in conjunction with FIG. 6.

Figure 7:
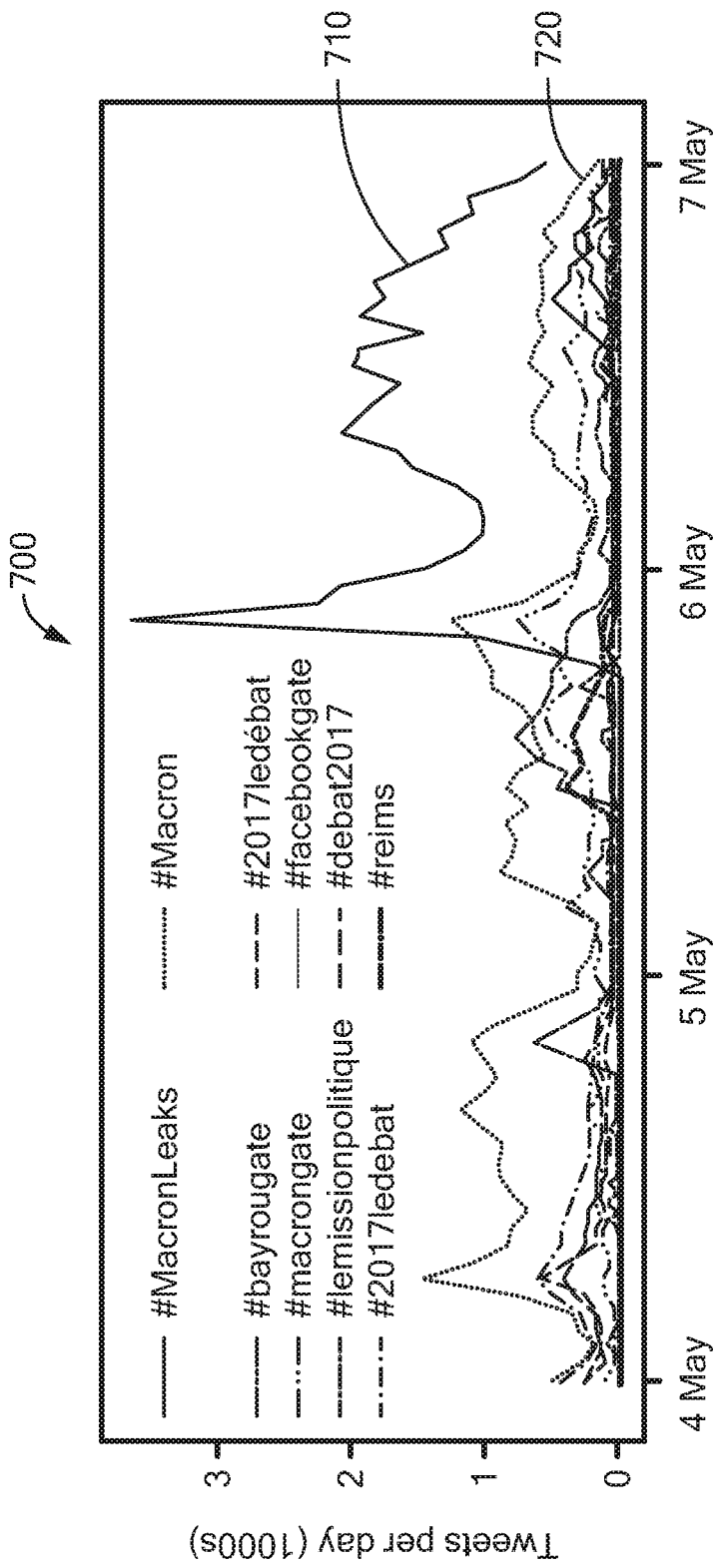
FIG. 7 is an illustrative plot of narratives frequencies to be used as an illustrative influence quantification of narratives/accounts according to the concepts described herein.

Referring now to FIG. 7, an illustrative plot 700 shows the top Twitter hashtag narrative frequencies in the 2017 French presidential election. In the described example, more than 20 million tweets and 2 million user accounts that may provide influences in the context of the 2017 French presidential elections were collected using the Twitter public API during April and May 2017. The plot shows a number of tweets 710, 720 for a number of topics or hashtags. In this example, an identified narrative is #MacronLeaks narrative 710, which refers to a plurality of leaked documents regarding a candidate in 2017 French election. The collected information indicates the narrative is propagated frequently until the mandatory French media blackout for the second round on 7 May started. The system for detection and quantification of influence, such as a system 100 in FIG. 1, may identify #MacronLeaks hashtag as a narrative for further investigation because the hashtag #MacronLeaks are tweeted and retweeted in a large number right before the French Election.

Figure 8:
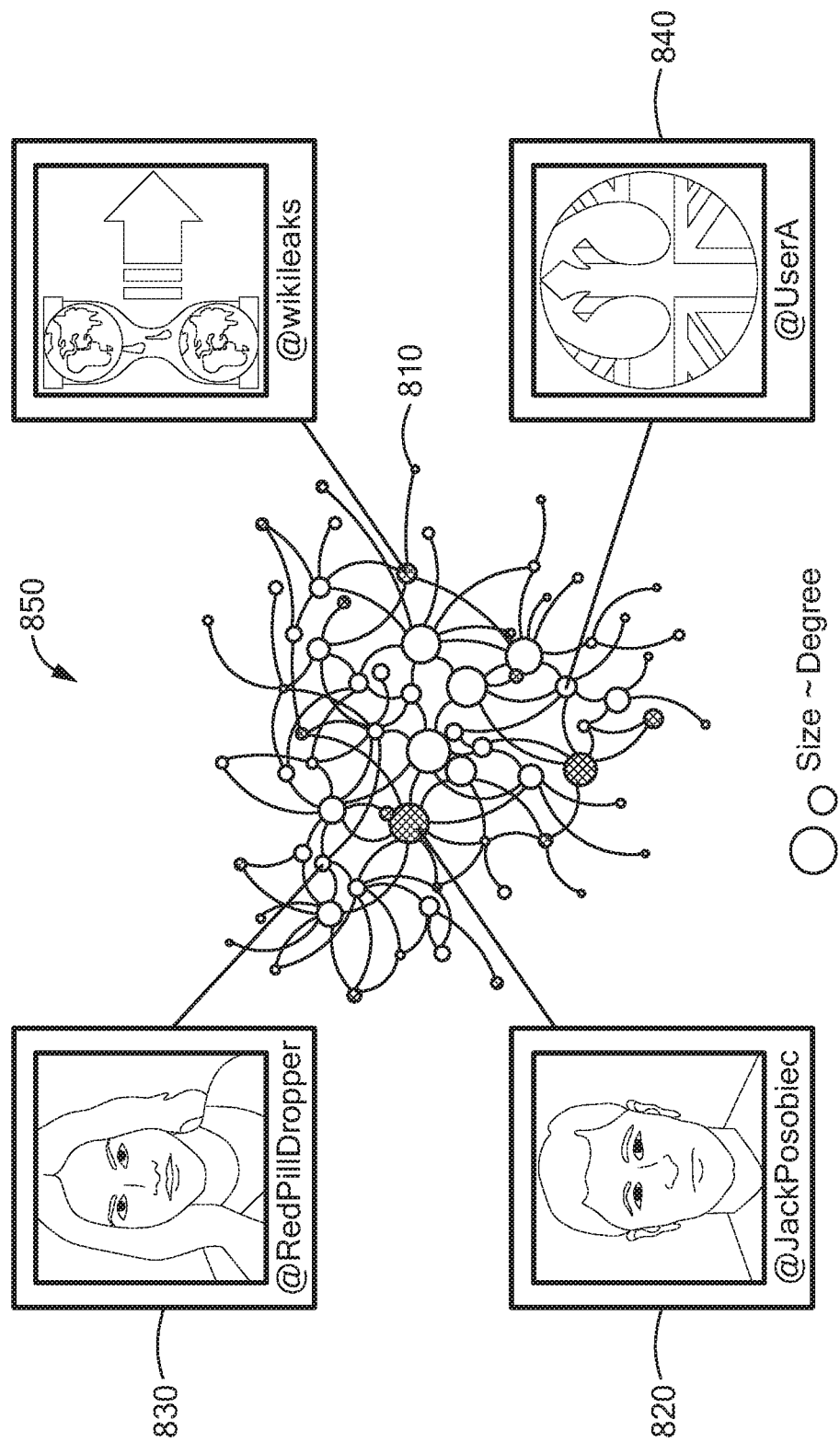
FIG. 8 is an illustrative representation of a social network highlighting potentially influential accounts to be used as an illustrative influence quantification of narratives/accounts according to the concepts described herein.

Referring now to FIG. 8, an illustrative narrative graph 850 based upon observed information of a plurality of accounts and their interactions is presented. In this example, the influence network graph 850 is prepared using information about 5,370 accounts and 124,259 interactions between the accounts. In the influence network, node 810 corresponds to an account and edges 850 (i.e., line) corresponds to interactions between the nodes. Based on the observed information on the accounts, potentially influential accounts 820, 830, 840 are identified based upon their activity levels and subsequent journalistic reports. Some of these accounts may be determined to possess high levels of causal influence, while others are estimated to have much less influence. As described above, an account with high activity may create a smaller influence than another account with less activity.

Figure 9:
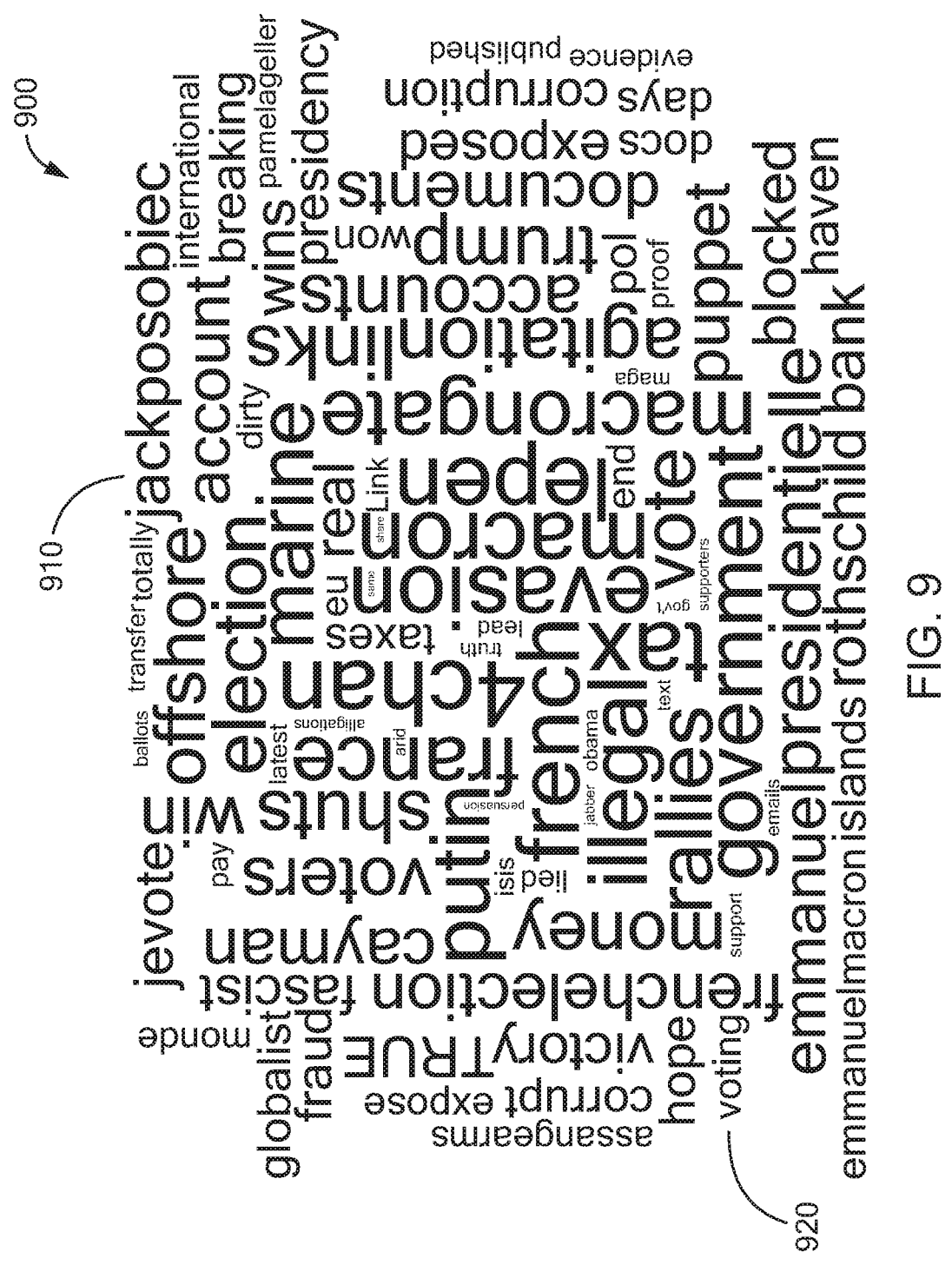

Referring now to FIG. 9, an illustrative tag cloud 900 of a social media network may comprise one or more potentially influential narratives is presented. Social influence may occur within a specific context. The sampled data must be filtered by a characterization of the narrative prior to influence estimation. This may be as simple as searching for a single keyword, utilizing natural language topic modeling approaches to focus on a specific narrative, or community detection approaches to filter the graph or some combination of these. The illustrative tag cloud 900 includes a plurality of topics or hashtags (with two hashtags being specifically identified via reference numerals 910, 920). In this example, a number of narratives 910, 920 related to the leaked documents in the context of a French election are included in the word cloud in FIG. 9. In embodiments, for a narrative that is clear and well-defined as in this example, a simple keyword search may be an adequate filter. In another embodiment, combining content-based narrative detection with a community detection method such as an Infomap clustering method may be necessary to estimate influence in broader contexts than provided by a single hashtag.

Figure 10:
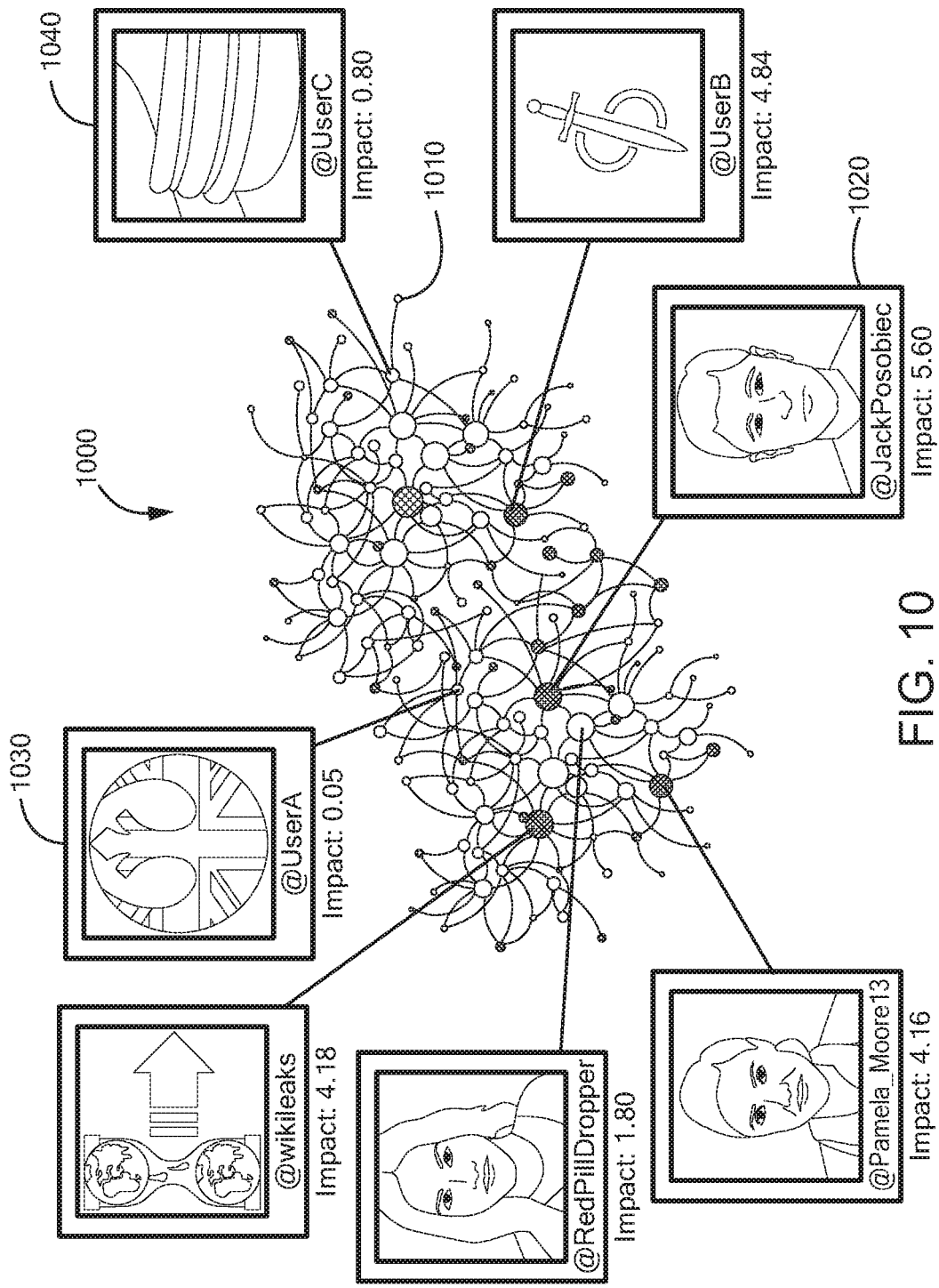
FIG. 10 is an illustrative representation of a social network showing a quantified influence of potentially influential accounts to be used as an illustrative influence quantification of narratives/accounts according to the concepts described herein.

Referring now to FIG. 10, an illustrative representation of a social network 1000 showing the quantified influence of potentially influential accounts is presented. Herein, the results of the causal impact estimation approach on the illustrative narrative of the leaked documents are shown in FIG. 10. Each of the nodes 1010 in the influence network represent an account in the social media networks. The nodes with darker color may correspond to identified accounts by a system for detection and quantification of influence (e.g., 110 in FIG. 1). Influence of the identified accounts 1020, 1030, 1040 is quantified using the process described in conjunction with FIGS. 5-6. For example, the influence of account @JackPosobiec 1020 is quantified as 5.60, while another user @UserA 1030 provided influence of 0.05. Accordingly, accounts or narratives providing a material influence on social media networks may be identified based on the quantification process.

In embodiments, quantification of influences may provide the ability of causal influence estimation to infer high impact beyond simple activity-based statistics. For example, observed information may show that accounts @UserA 1030 and @UserC 1040 were highly active and tweeted about the narrative more than @JackPosobiec, but the quantified influence of the accounts @UserA 1030 and @UserC 1040 is lower than the quantified influence of @JackPosobiec 1020. As observed in FIG. 10, higher out-degree is correlated with impact but provides only partial information for influence estimation.

Additional analysis may be necessary to address important issues and potential limitations of these specific results and the current approach. In embodiments, an analysis may use a uniquely impactful source per causal influence estimate. The analysis also may rely upon a specific potential outcome model in a model database (e.g., 410 in FIG. 4). Herein, rigorous model checking and tuning is required to be performed. Since knowing an exact potential outcome model in real-world studies is not possible, the biasing effects of confounding covariates may not be removed entirely through modeling. Additional mitigation is required through selecting and weighing observed outcomes to balance the confounding covariates across different exposure groups, as a sound practice in observational studies. Furthermore, this analysis may emphasize the population engaged in the narrative. The effect of this selection bias can be addressed by including the population that is not engaged, but receptive to influence. The narrative filtering process described above may provide the data on this type of population.

Figure 11:
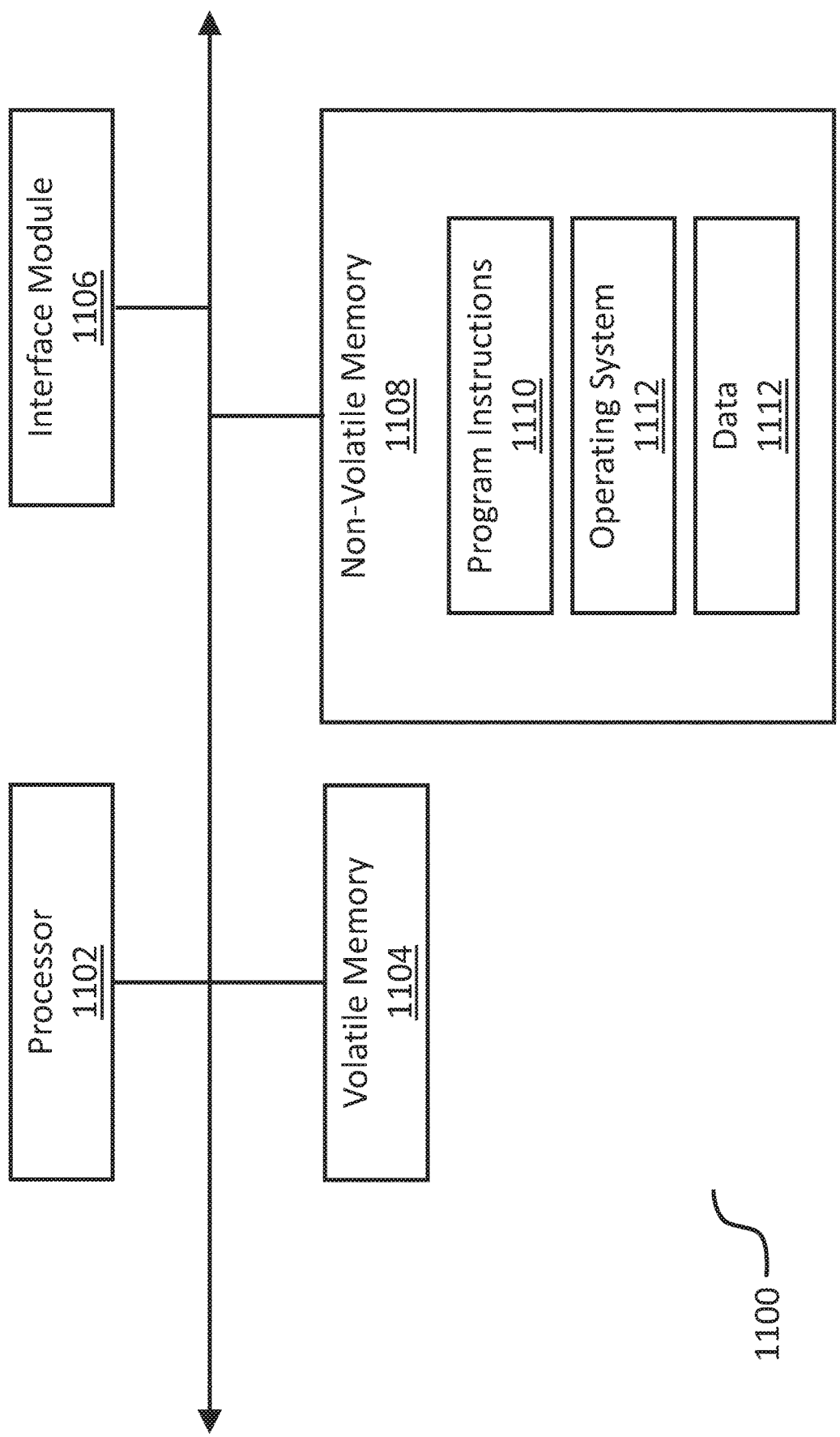
FIG. 11 is a block diagram of an illustrative processing system on which a process for detecting and quantifying influence may be executed.

Referring now to FIG. 11, an illustrative implementation of a processing device 1100 which may be suitable to implement the processing techniques described herein includes a processor 1102, a volatile memory 1104, a non-volatile memory 1108 (e.g., hard disk) and the interface module 1108 (e.g., a user interface, USB interface and so forth). The non-volatile memory 1108 may store computer instructions 1110, an operating system 1112 and data 1114. In one example, the computer instructions 1110 are executed by the CPU 1102 out of volatile memory 1104 to perform all or part of the processes described herein (e.g., processes 200, 500).

The processes described herein (e.g., processes 200, 500) are not limited to use with hardware and software of FIG. 1 or 11; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Statistical inferential methods are used to estimate model parameters for causal influence on social networks. Cramer-Rao estimation bounds are derived for this parameter estimation problem and used for geometrical insight on the causal inference problem. Natural language processing tools are used to filter the network data into one or more narratives for influence estimation, and to differentiate the sampled graph data into case/non-case data.

The described approach was applied to publicly available Twitter data collected over the 2017 French presidential elections, during which there was an active influence operation campaign targeting these elections. An inventive concept to infer high causal influence is described using actual social media accounts. Furthermore, the approach described herein is shown to reveal influential accounts that are not obvious based upon simple activity statistics, which validates the proposed causal influence estimation framework.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A system for detection and quantification of influence, the system comprising:
   a network sampling processor configured to:
   sample information on one or more social media networks;
   a narrative discovery processor configured to:
   receive sampled information from the network sampling processor, and
   in response thereto identify a narrative related to a subset of information sampled by the network sampling processor; and
   an influence quantification processor configured to:
   receive information related to the narrative and to process the information via a network causal inference process to quantify influence of the narrative on the one or more social media networks;
   wherein the influence quantification processor further comprises:
   a model database comprising one or more potential outcome models;
   a model parameter estimator configured to estimate one or more parameters of a potential outcome model selected from the one or more potential outcome models; and
   an unseen counter-factual outcomes processor configured to quantity influence of the narrative using the selected potential outcome model.

2. The system of claim 1, wherein the network sampling processor is further configured to:
   identify a context of interest; and
   sample the information on the one or more social media networks to generate a subset of the information related to the context of interest.

3. The system of claim 1, wherein the influence quantification processor is further configured to:
   in response to the quantified influence of the narrative exceeding a predefined threshold, alert one or more network administrators about the narrative.

4. The system of claim 3, wherein the influence quantification processor is further configured to:
generate actionable information related to the narrative having the quantified influence exceeding the predefined threshold; and
transfer the actionable information to the one or more network administrators.

5. The system of claim 1, further comprising:
a network interface configured to:
connect the one or more social media networks via an internet.

6. The system of claim 1, wherein the model parameter estimator receives the selected potential outcome model, observed outcomes on the one or more social media networks, and observed network structure.

7. A method for detection and quantification of influence, the method comprising:
collecting information from one or more social media networks;
identify a context of interest;
sampling the information collected from the one or more social media networks to generate a subset of the information related to the context of interest;
identifying one or more narratives contained within the generated subset of information and related to the context of interest;
quantifying influence of the one or more identified narratives on the context of interest;
storing one or more potential outcome models in a model database;
estimating, by a model parameter estimator, one or more parameters of a potential outcome model selected from the one or more potential outcome models; and
quantifying, by an unseen counter-factual outcomes processor, the narrative using the selected potential outcome model.

8. The method of claim 7, further comprising:
in response to an impact of the one or more narratives reaching a predetermined threshold, alerting one or more network administrators.

9. The method of claim 7, wherein quantifying the influence of the one or more identified narratives comprises evaluating at least one of content-based information and account-based information.

10. The method of claim 7, wherein collecting information comprises one or more of:
(a1) observing interactions between one or more accounts on one or more social media networks interact;
(a2) collecting information related to two or more concepts being used together on one or more social media networks;
(a3) collecting content-based information; and
(a4) collecting account-based information.

* * * * *